(12) United States Patent
Singh

(10) Patent No.: US 12,557,146 B2
(45) Date of Patent: Feb. 17, 2026

(54) DETERMINING RANDOM-ACCESS CHANNEL IMPACTED CELLS IN WIRELESS NETWORK

(71) Applicant: Rakuten Symphony, Inc., Tokyo (JP)

(72) Inventor: Ajeetkumar Singh, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 401 days.

(21) Appl. No.: 18/021,406

(22) PCT Filed: Dec. 23, 2022

(86) PCT No.: PCT/US2022/053938
§ 371 (c)(1),
(2) Date: Feb. 15, 2023

(87) PCT Pub. No.: WO2024/102149
PCT Pub. Date: May 16, 2024

(65) Prior Publication Data
US 2024/0267951 A1 Aug. 8, 2024

(30) Foreign Application Priority Data
Nov. 8, 2022 (IN) .............................. 202221063666

(51) Int. Cl.
*H04W 74/0833* (2024.01)
*H04W 28/02* (2009.01)
(Continued)

(52) U.S. Cl.
CPC ... *H04W 74/0833* (2013.01); *H04W 28/0289* (2013.01)

(58) Field of Classification Search
CPC ......... H04W 74/0833; H04W 28/0289; H04W 76/18; H04W 24/04; H04W 24/08; H04W 16/08; H04W 36/22; H04W 72/12
See application file for complete search history.

(56) References Cited

U.S. PATENT DOCUMENTS

| | | | | |
|---|---|---|---|---|
| 2013/0286830 A1* | 10/2013 | Xu | ..................... | H04B 7/18584 370/232 |
| 2022/0116800 A1* | 4/2022 | Shankaranarayanan | ..................... | H04W 24/02 |
| 2022/0286863 A1* | 9/2022 | Sarkar | ................... | H04W 24/02 |

OTHER PUBLICATIONS

Written Opinion of the International Searching Authority dated Apr. 25, 2023, in Application No. PCT/US22/53938.
(Continued)

*Primary Examiner* — Moo Jeong
*Assistant Examiner* — Theresa Nguyen
(74) *Attorney, Agent, or Firm* — Sughrue Mion, PLLC

(57) ABSTRACT

Embodiments herein disclose a method and electronic device (200) for determining a Random-Access Channel (RACH) impacted cell (400) in a wireless network (100), wherein the method comprises receiving, by the electronic device (300), RACH KPI of each cell of a plurality of cells (400A, 400B) for a predefined time period. The method further determines a RACH counter indicating a number of RACH attempts made for the predefined time period based on the RACH KPI for each cell of the plurality of cells (400A, 400B). The method further determines whether the number of RACH attempts determined for the predefined time period meets a RACH counter threshold for each cell of the plurality of cells (400A, 400B) to detect RACH impacted cell (400) or non-impacted cell. The method further provides a mitigation plan for the RACH impacted cell to optimize the performance of the wireless network.

6 Claims, 5 Drawing Sheets

(51) Int. Cl.
  *H04W 24/04* (2009.01)
  *H04W 24/08* (2009.01)
  *H04W 76/18* (2018.01)

(56) References Cited

OTHER PUBLICATIONS

International Search Report dated Apr. 25, 2023, in Application No. PCT/US 22/53938.

* cited by examiner

DETERMINING RANDOM-ACCESS CHANNEL IMPACTED CELLS IN WIRELESS NETWORK

CROSS REFERENCE TO RELATED APPLICATIONS

This application is a National Stage of International Application No. PCT/US2022/053938, filed Dec. 23, 2022, claiming priority to Indian Patent Application No. 202221063666, filed Nov. 8, 2022.

FIELD OF INVENTION

The embodiments herein relate to an electronic device, and more particularly relates to a method and an electronic device for determining random-access channel impacted cells in a wireless network.

BACKGROUND OF THE INVENTION

Generally, a Random Access Channel (RACH) is a shared channel used by user equipments to access a wireless network for call set-up and bursty data transmission. The user equipments sometimes have difficulty initiating call or transmitting the burstly data in the wireless network due to RACH failures. In most of the scenarios, the RACH failures happen due to cells with poor initial access capabilities herein referred as RACH impacted cell.

Hence there is a high demand for identifying the RACH impacted cells in the wireless network and identifying a root cause of the RACH impacted cells. Further there is a high demand in providing mitigation solutions for the identified RACH impacted cell according to the identified root cause.

In conventional methods for detecting and analyzing the RACH impacted cells people need to manually analyze Key Performance Indicator (KPI) data to identify the RACH impacted cell. Hence conventional methods reduces productivity, increases usage of the labors, low quality in identifying the RACH impacted cell, increases analyzing time and longtime suffering for a user to initiate the call.

Further, the conventional methods cannot identify the root cause of the RACH impacted cells.

Thus, it is desired to address the above-mentioned disadvantages or other shortcomings or at least provide a useful alternative.

OBJECT OF INVENTION

The principal object of the embodiments herein is to provide a method and an electronic device for determining a Random-Access Channel (RACH) impacted cell in a wireless network and to provide a mitigation plan to optimize the RACH impacted cell to provide flexible and reliable communication to a user.

Another object of the embodiments herein is to detect a cell as the RACH impacted cell when a number of RACH attempts determined for a predefined time period meets a RACH counter threshold automatically without any manual intervention or usage of labors.

Another object of the embodiments herein is to determine mitigation plans for the RACH impacted cell to optimize performance of the wireless network based on the number of RACH attempts to solves a user problem rapidly.

Another object of the embodiments herein is to optimize the performance of the wireless network by applying the mitigation plans on the RACH impacted cell in the wireless network.

SUMMARY

Accordingly, the embodiments herein disclose an electronic device for determining a Random-Access Channel (RACH) impacted cell in a wireless network, wherein the electronic device comprises a memory and a processor. The processor is configured to receive RACH KPI of each cell of a plurality of cells for a predefined time period. The processor is configured to determine a RACH counter indicating a number of RACH attempts made for the predefined time period based on the RACH KPI for each cell of the plurality of cells and determine whether the number of RACH attempts determined for the predefined time period meets the RACH counter threshold for each cell of the plurality of cells. The processor is further configured to detect a cell of the plurality of cells as RACH impacted cell when the RACH counter of the cell meets a RACH attempt threshold and detect a cell of the plurality of cells as non-impacted cell when the RACH counter of the cell does not meet the RACH attempt threshold. The processor is further configured to generate a RACH cell report comprising information about the RACH impacted cell and the non-impacted cell.

In an embodiment, the processor is configured to determine whether a load of the at least one RACH impacted cell in the wireless network meets a load threshold. Further the processor is configured to determine at least one mitigation plan for the at least one RACH impacted cell to optimize performance of the wireless network based on the RACH counter of the at least one RACH impacted cell in response to determining that the load of the at least one RACH impacted cell meets the load threshold. Further the processor is configured to optimize the performance of the wireless network by applying the mitigation plan on the at least one RACH impacted cell in the wireless network.

Accordingly, the embodiments herein disclose a method for determining the RACH impacted cell in the wireless network. The method further includes receiving by the electronic device the RACH KPI of each cell of the plurality of cells for the predefined time period and determining by the electronic device the RACH counter indicating the number of RACH attempts made for the predefined time period based on the RACH KPI for each cell of the plurality of cells. The method further includes determining whether the number of RACH attempts determined for the predefined time period meets the RACH counter threshold for each cell of the plurality of cells. The method further includes detecting the cell of the plurality of cells as RACH impacted cell when the RACH counter of the cell meets the RACH attempt threshold or detecting the cell of the plurality of cells as non-impacted cell when the RACH counter of the cell does not meet the RACH attempt threshold. The method further includes generating the RACH cell report comprising information about the RACH impacted cell and the non-impacted cell.

In an embodiment, determining by the electronic device whether the load of the RACH impacted cell in the wireless network meets the load threshold and determining the mitigation plan for the RACH impacted cell to optimize performance of the wireless network based on the RACH counter of the RACH impacted cell in response to determining that the load of the RACH impacted cell meets the load threshold. The method further includes optimizing the performance of the wireless network by applying the mitigation plan on the RACH impacted cell in the wireless network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
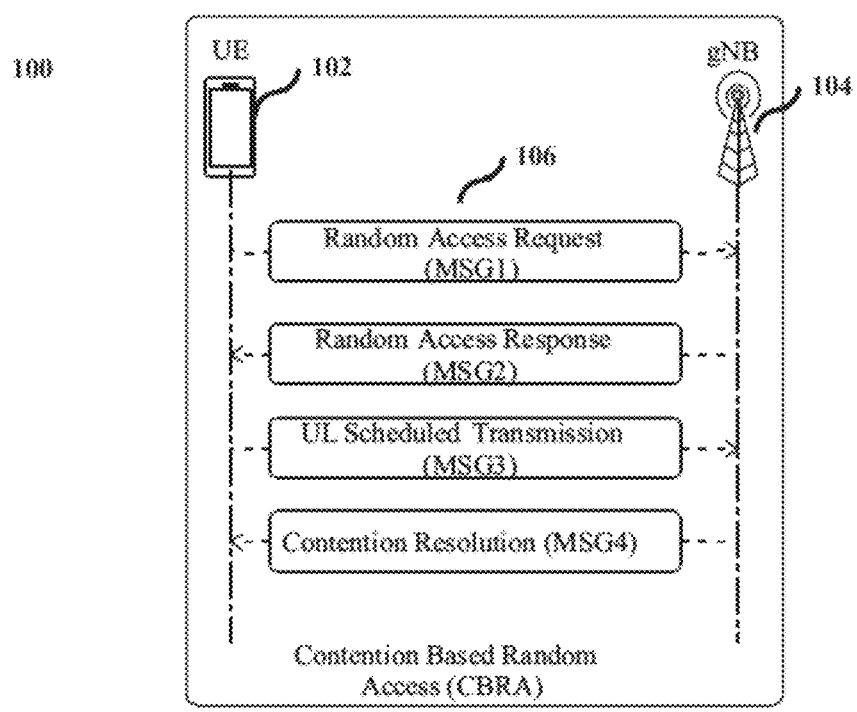
FIG. 1 is a schematic diagram illustrating Random-Access Channel (RACH) messages for connection setup messages between a user equipment and a cell in a wireless network, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be constructed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for determining a Random-Access Channel (RACH) impacted cell in a wireless network. The method further includes receiving by an electronic device a RACH KPI of each cell of a plurality of cells for a predefined time period and determining by the electronic device a RACH counter indicating a number of RACH attempts made for the predefined time period based on the RACH KPI for each cell of the plurality of cells. The method further includes determining whether the number of RACH attempts determined for the predefined time period meets a RACH counter threshold for each cell of the plurality of cells. The method further includes detecting a cell of the plurality of cells as RACH impacted cell when the RACH counter of the cell meets the RACH attempt threshold or detecting a cell of the plurality of cells as non-impacted cell when the RACH counter of the cell does not meet the RACH attempt threshold. The method further includes generating a RACH cell report comprising information about the RACH impacted cell and the non-impacted cell.

Accordingly, the embodiments herein disclose the electronic device for determining the RACH impacted cell in the wireless network, wherein the electronic device comprises a memory, a processor and a RACH impacted cell controller, communicatively coupled to the memory and the processor, configured to receive RACH KPI of each cell of the plurality of cells for the predefined time period. The RACH impacted cell controller is configured to determine the RACH counter indicating the number of RACH attempts made for the predefined time period based on the RACH KPI for each cell of the plurality of cells and determine whether the number of RACH attempts determined for the predefined time period meets the RACH counter threshold for each cell of the plurality of cells. The RACH impacted cell controller is further configured to detect a cell of the plurality of cells as RACH impacted cell when the RACH counter of the cell meet the RACH attempt threshold and detect a cell of the plurality of cells as non-impacted cell when the RACH counter of the cell does not meet the RACH attempt threshold. The RACH impacted cell controller is further configured to generate the RACH cell report comprising information about the RACH impacted cell and the non-impacted cell.

In existing systems, detecting and analyzing the RACH impacted cells are not automated, where people needs to manually analyze the Key Performance Indicator (KPI) data to identify the RACH impacted cell which increases usage of labors, long time for analyzing the KPI data.

Unlike existing system, problems due to RACH failures are solved rapidly with the help of automation which solves a user problem rapidly, increases productivity and increases quality in identifying the RACH impacted cell.

Unlike existing system, proposed method identifies the RACH impacted cells and a root cause of the RACH impacted cells. Further the proposed method provide mitigation solution for the identified RACH impacted cells in accordance with the identified root cause.

FIG. 1 is a schematic diagram illustrating a RACH messages (106) for connection setup messages between a user equipment (102) and a cell (104) in the wireless network (100), according to a prior art.

The RACH messages (106) are communicated in between the user equipment (UE) (102) and the cell (104) to access the wireless network for call set-up and bursty data transmission.

The UE transmits a random access preamble transmission (Msg1) and receives a random access response (Msg2). Further The UE transmits a scheduled u1 transmission (Msg3) and receives a contention resolution (Msg4).

Referring now to the drawings, and more particularly to FIG. 2 through FIG. 6, there are shown preferred embodiments.

Figure 2:
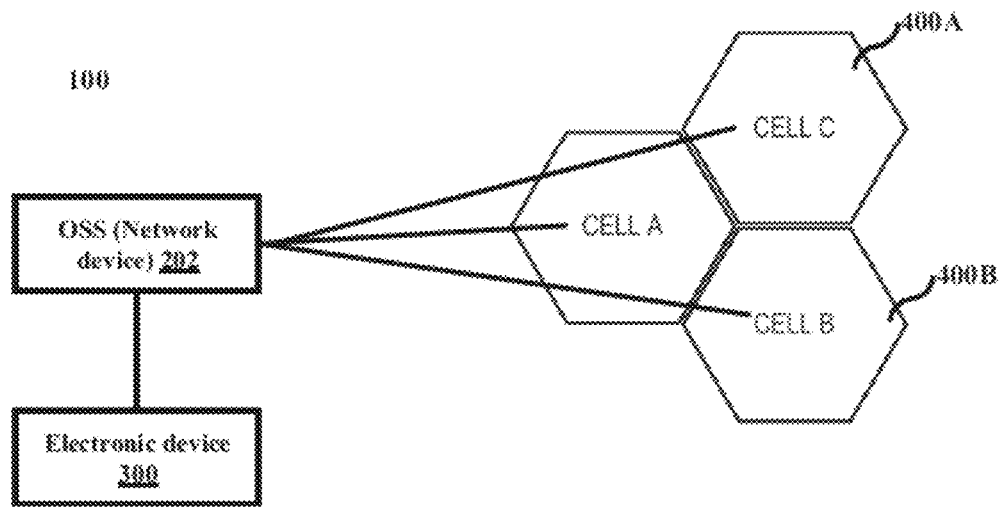
FIG. 2 is a schematic diagram illustrating plurality of cells connected with an operational support system (network device) in the wireless network, according to the embodiments as disclosed herein.

FIG. 2 is a schematic diagram illustrating plurality of cells (400A, 400B) connected with an operational support system in the wireless network (100), according to the embodiments as disclosed herein.

The Operational Support System (OSS) is otherwise called as network device (202). The plurality of cells (404A, 400B) are connected with the OSS (network device) (202) in the wireless network (100).

The network device (202) monitors a plurality of KPIs (e.g RACH SR, RACH attempt, message counter) associated with the plurality of cells (404A, 400B) over a period of time; and stores the plurality of KPIs associated with the plurality of cells (404A, 400B) over the period of time in a database.

The network device (202) receives a request for KPI from an electronic device (300). Further, the network device (202) responds a KPI response comprising the plurality of KPIs associated with the plurality of cells (404A, 400B).

Figure 3:
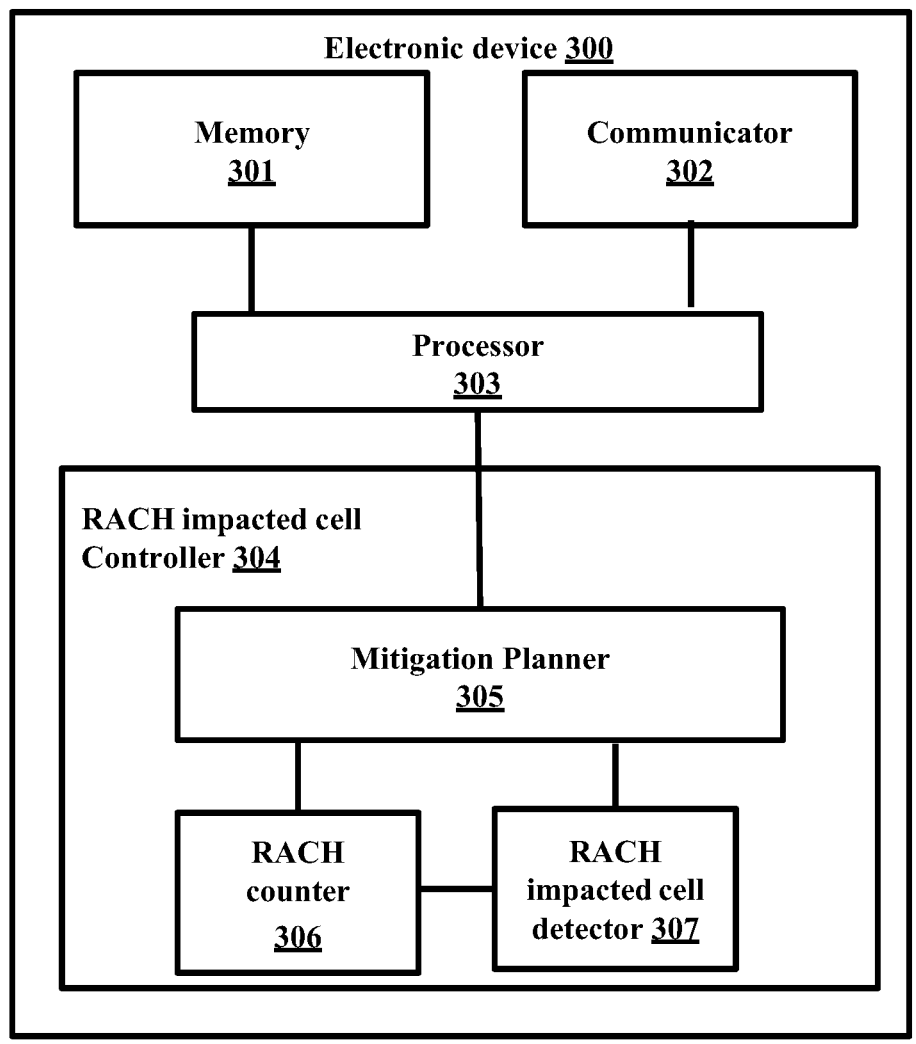
FIG. 3 is a block diagram of an electronic device for determining a RACH impacted cell in the wireless network, according to the embodiments as disclosed herein.

FIG. 3 is a block diagram of the electronic device (300) for determining a RACH impacted cell (400) in the wireless network (100), according to the embodiments as disclosed herein.

Referring to FIG. 3, examples of the electronic device (300) include, but are not limited to a laptop, a palmtop, a desktop, a mobile phone, a smartphone, Personal Digital Assistant (PDA), a tablet, a wearable device, an Internet of Things (IoT) device, a virtual reality device, a foldable device, a flexible device, an immersive system, etc.

In an embodiment, the electronic device (300) includes a memory (301), a processor (303), a communicator (302), and a RACH impacted cell controller (304).

The memory (301) stores instructions to be executed by the processor (303) for determining the RACH impacted cell (400) in a wireless network (100). The memory also stores the received RACH KPI of each cell of a plurality of cells (400A, 400B). The memory (301) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (301) may, in some examples, be considered a non-transitory storage medium. The term "non-transitory" may indicate that the storage medium is not embodied in a carrier wave or a propagated signal. However, the term "non-transitory" should not be interpreted that the memory (301) is non-movable. In some examples, the memory (301) can be configured to store larger amounts of information than its storage space. In certain examples, a non-transitory storage medium may store data that can, over time, change (e.g., in Random Access Memory (RAM) or cache). The memory (301) can be an internal storage unit or it can be an external storage unit of the electronic device (300), a cloud storage, or any other type of external storage.

The processor (303) is configured to execute instructions stored in the memory (301) to determine the RACH impacted cell (400) in the wireless network (100). The processor is connected to the RACH impacted cell controller (304) to process the instructions which are received from the RACH impacted cell controller (304). The processor (303) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (303) may include multiple cores to execute the instructions.

The communicator (302) is configured for communicating internally between hardware components in the electronic device (300). Further, the communicator (302) is configured to facilitate communication between the electronic device (300) and other devices via one or more networks (e.g. Radio technology). RACH impacted cell controller (304) uses the communicator (302) for receiving the RACH KPI of each cell of a plurality of cells (400A, 400B) from the network device (202). The communicator (302) includes an electronic circuit specific to a standard that enables wired or wireless communication.

The processor is coupled with other processor such as RACH impacted cell controller (304) to perform the embodiments.

The RACH impacted cell controller (304) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The RACH impacted cell (400) in the embodiment is refer to a base station or any radio node.

The RACH impacted cell controller (304) includes a RACH counter (306), a RACH impacted cell detector (307) and a mitigation planner (305).

The RACH counter (306) receive the RACH KPI of each cell of the plurality of cells (400A, 400B) for a predefined time period. Further the RACH counter (306) indicates a number of RACH attempts made for the predefined time period based on the RACH KPI for each cell of the plurality of cells (400A, 400B). Further, the RACH counter (306) determines whether the number of RACH attempts determined for the predefined time period meets a RACH counter threshold for each cell of the plurality of cells (400A, 400B).

The RACH impacted cell detector (307) detects a cell of the plurality of cells (400A, 400B) as RACH impacted cell (400) when the RACH counter of the cell meet the RACH attempt threshold. The RACH impacted cell detector (307) detects a cell of the plurality of cells (400A, 400B) as non-impacted cell when the RACH counter of the cell does not meet the RACH attempt threshold.

The mitigation planner (305) generates a RACH cell report comprising information about the RACH impacted cell (400) and the non-impacted cell.

The RACH impacted cell controller (304) is configured to determine whether a load of the RACH impacted cell (400) in the wireless network (100) meets a load threshold. The RACH impacted cell controller (304) is further configured to determine a mitigation plan for the RACH impacted cell (400) to optimize performance of the wireless network (100) based on the RACH counter of the RACH impacted cell (400) in response to determining that the load of the RACH impacted cell (400) meets the load threshold. The RACH impacted cell controller (304) is further configured to optimize the performance of the wireless network (100) by applying the mitigation plan on the RACH impacted cell (400) in the wireless network (100).

The RACH impacted cell controller (304) is configured to determine at least one neighbour cell of the RACH impacted cell (400) based on the RACH counter and detect whether a Root Sequence Index (RSI) collision between the RACH impacted cell (400) and the neighbour cell. The RACH impacted cell controller (304) is further configured to generate the mitigation plan when the RSI collision is detected, wherein the mitigation plan comprises changes to the RSI of the neighbour cell or blacklist the neighbour cell having a long distance neighbour relationship. The RACH impacted cell controller (304) is further configured to generate the mitigation plan when the RSI collision is not detected, wherein the mitigation plan comprises delete the neighbour cell having a far distance upcoming neighbour relation upto two tier or blacklist a long distance neighbour relation.

The RACH impacted cell controller (304) is configured to determine whether the RACH counter of the RACH impacted cell (400) is only for a large size message or for both a large size message and a small size message. The RACH impacted cell controller (304) is further configured to generate the mitigation plan when the RACH counter of the RACH impacted cell (400) is for both the large and small messages, wherein the mitigation plan comprises at least one of checking UpLink (UL) Interference KPI, analyzing a DownLink (DL) Interference Log file, checking an overshooting KPI, and checking robustness of a Physical Downlink Control Channel (PDCCH) and Physical Downlink Shared Channel (PDSCH), and generate the mitigation plan when the RACH counter of the RACH impacted cell (400) is only for the large size message, wherein the mitigation plan comprises checking poor coverage issue and comparing distance between a user equipment and a nearest cell.

Figure 4:
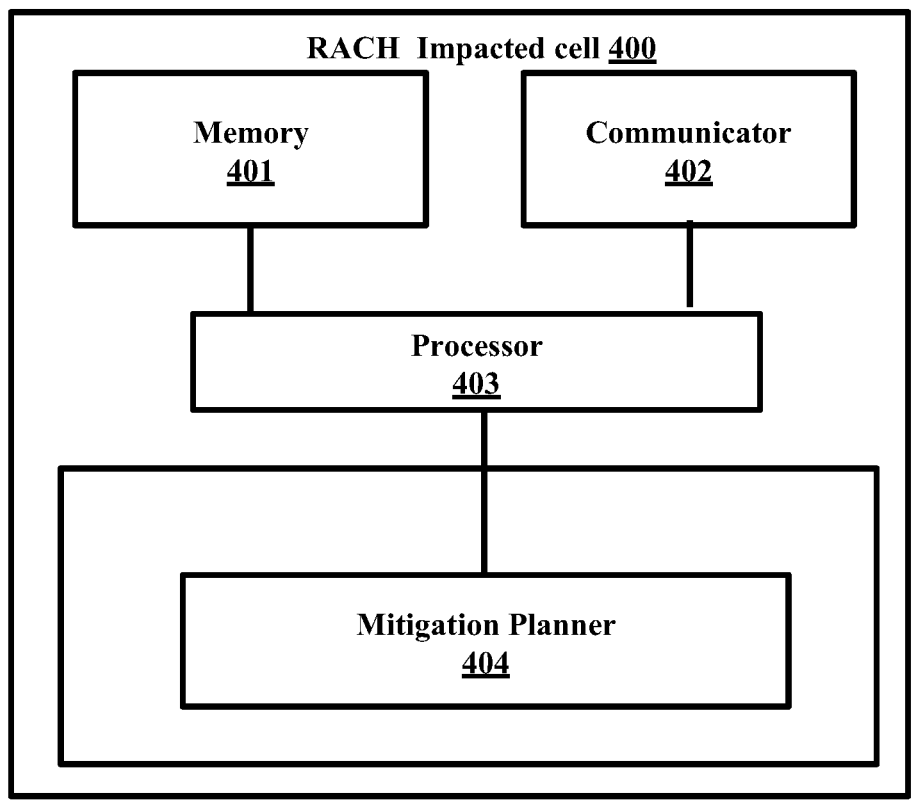
FIG. 4 is a block diagram of the RACH impacted cell with a mitigation planner, according to the embodiments as disclosed herein.

FIG. 4 is a block diagram of the RACH impacted cell (400) with a mitigation planner (404), according to the embodiments as disclosed herein.

Referring to FIG. 4, examples of the RACH impacted cell (400) include, but are not limited to the base station, radio node, eNodeB (eNB), etc.

In an embodiment, the RACH impacted cell (400) includes a memory (401), a processor (403), a communicator (402), and a mitigation planner (404).

The memory (401) stores instructions received from the electronic device (300). The memory (401) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (401) may, in some examples, be considered a non-transitory storage medium. The term "non-transitory" may indicate that the storage medium is not embodied in a carrier wave or a propagated signal. However, the term "non-transitory" should not be interpreted that the memory (401) is non-movable. In some examples, the memory (401) can be configured to store larger amounts of information than its storage space. In certain examples, a non-transitory storage medium may store data that can, over time, change (e.g., in Random Access Memory (RAM) or cache). The memory (401) can be an internal storage unit or it can be an external storage unit of the RACH impacted cell (400), a cloud storage, or any other type of external storage.

The processor (403) is configured to execute instructions stored in the memory (401). The processor is connected to the RACH impacted cell controller (304) to process the instructions which are received from the RACH impacted cell controller (304). The processor (403) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (403) may include multiple cores to execute the instructions.

The communicator (402) is configured for communicating internally between hardware components in the RACH impacted cell (400). Further, the communicator (402) is configured to facilitate the communication between the RACH impacted cell (400) and other devices via one or more networks (e.g. Radio technology) or electronic device (300). The communicator (402) includes an electronic circuit specific to a standard that enables wired or wireless communication.

The mitigation planner (404) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The mitigation planner (404) receives the mitigation plan from the electronic device (300) and optimizing, by the RACH impacted cell, the performance of the RACH impacted cell by applying the received mitigation plan.

The mitigation planner (404) applies the mitigation plan at the RACH impacted cell comprises: at least one of changing RSI of the neighbour cell, deleting the neighbour cell having a far distance upcoming neighbour relation upto two tier or blacklist a long distance neighbour relation, wherein long distance neighbour is the cells which are separated by a long distance and no neighbour cell in between the cells, wherein the two tier is one cell next to neighbour and then next to next neighbour, wherein the upcoming neighbour relation is a relation from other cell to the cell.

The mitigation plan at the RACH impacted cell further comprises: at least one of checking UpLink (UL) Interference KPI, analyzing a DownLink (DL) Interference Log file, checking an overshooting KPI, and checking robustness of a Physical Downlink Control Channel (PDCCH) and Physical Downlink Shared Channel (PDSCH). The mitigation plan at the RACH impacted cell further comprises: at least one of checking poor coverage issue and comparing a distance between the user equipment and the nearest cell.

Figure 5:
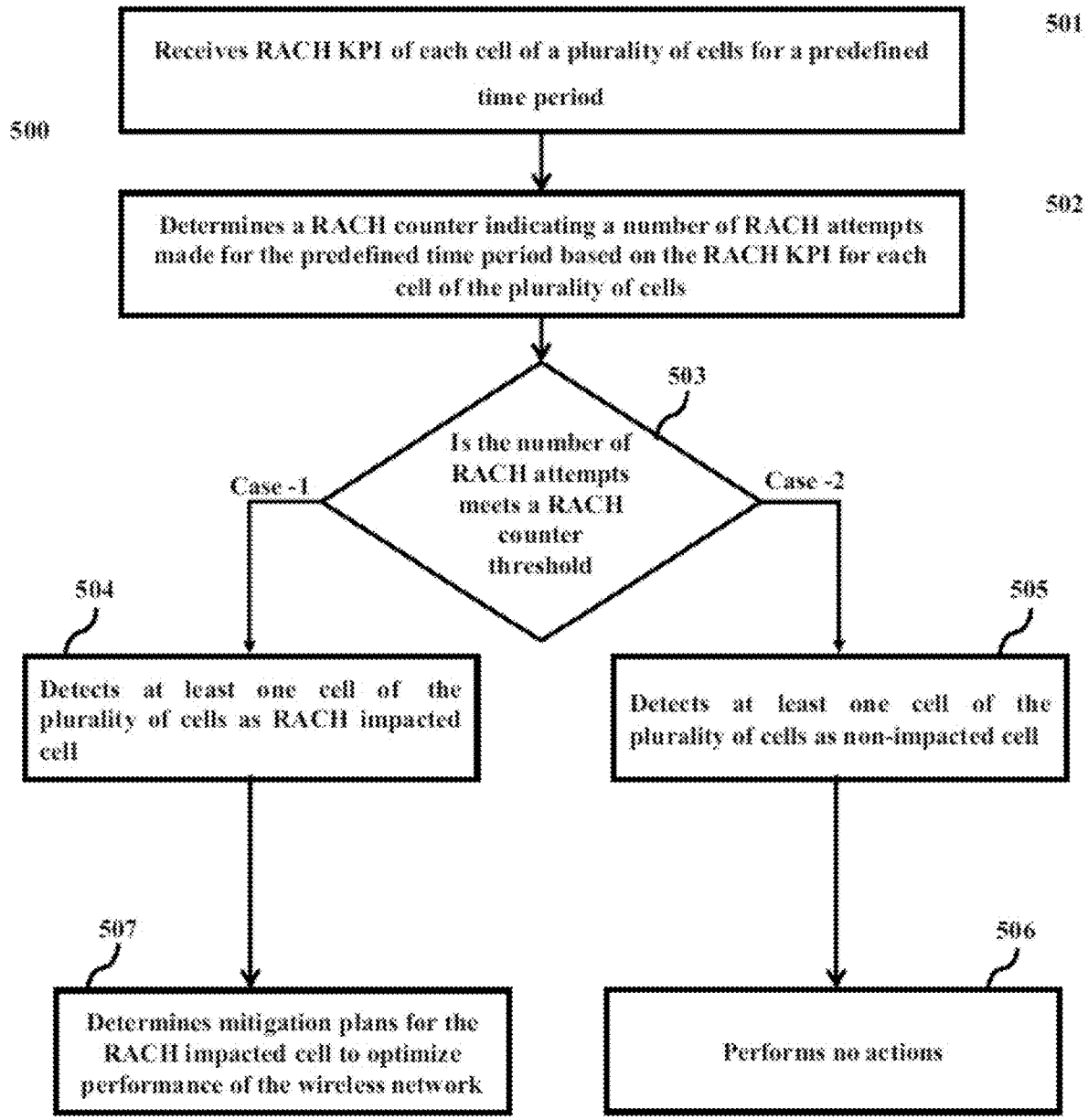
FIG. 5 is a flow diagram illustrating a method for determining the RACH impacted cell in the wireless network, according to the embodiments as disclosed herein.

FIG. 5 is a flow diagram (500) illustrating a method for determining the RACH impacted cell (400) in the wireless network (100), according to the embodiments as disclosed herein.

The step 501 to step 506 of the flow diagram (500) are performed by the electronic device (300).

At step 501, the electronic device (300) receives the RACH KPI of each cell of the plurality of cells (400A, 400B) for a predefined time period.

At step 502, the electronic device (300) determines a RACH counter indicates a number of RACH attempts made for the predefined time period based on the RACH KPI for each cell of the plurality of cells (400A, 400B).

At step 503, the electronic device (300) determines whether the number of RACH attempts determined for the predefined time period meets a RACH counter threshold for each cell of the plurality of cells (400A, 400B).

At step 504, the electronic device (300) detects a cell of the plurality of cells (400A, 400B) as RACH impacted cell (400) when the RACH counter of the cell meet the RACH attempt threshold.

At step 505, the electronic device (300) detects a cell of the plurality of cells (400A, 400B) as non-impacted cell when the RACH counter of the cell does not meet the RACH attempt threshold.

At step 506, the electronic device (300) performs no actions after detecting the cell of the plurality of cells (400A, 400B) as non-impacted cell.

At step 506, the electronic device (300) determines mitigation plan for the RACH impacted cell to optimize performance of the wireless network.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 6:
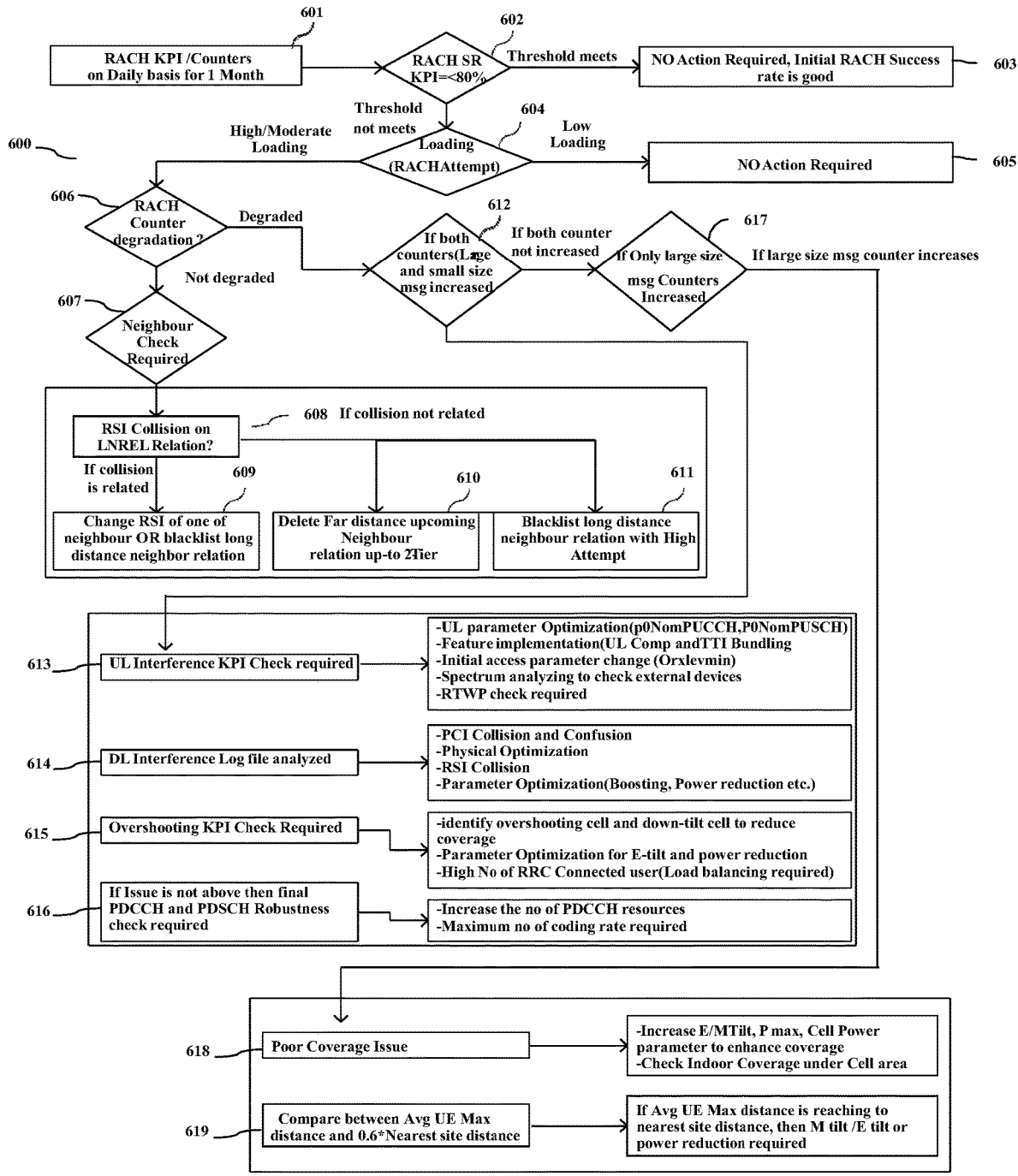
FIG. 6 is a flow chart illustrating a process involved in determining the RACH impacted cell in the wireless network and providing mitigation plans, according to the embodiments as disclosed herein.

FIG. 6 is a flow chart (600) illustrating a process involved in determining the RACH impacted cell (400) in the wireless network (100) and providing the mitigation plans, according to the embodiments as disclosed herein.

The step 601 to step 619 of the flow diagram (600) are performed by the electronic device (300).

At step 601, the electronic device (300) receives the RACH KPI of each cell of the plurality of cells (400A, 400B) for a predefined time period (e.g. 1 Month)

At step 602, the electronic device (300) determines a RACH counter that indicates a number of RACH attempts made for the predefined time period based on the RACH KPI for each cell of the plurality of cells (400A, 400B). Further, the electronic device (300) determines whether the number of RACH attempts determined for the predefined time period meets a RACH counter threshold (e.g. lesser then 80% of initial success rates) for each cell of the plurality of cells (400A, 400B).

At step 603, the electronic device (300) performs no action when the number of RACH attempts determined for the predefined time period not meets the RACH counter threshold (for e.g. 80% of initial success rates).

At step 603, the electronic device (300) determines whether a load of the RACH impacted cell (400) in the wireless network (100) meets a load threshold when the number of RACH attempts determined for the predefined time period meets the RACH counter threshold (for e.g. lesser than 80% of initial success rates).

At step 604, the electronic device (300) determines whether the load of the RACH impacted cell (400) in the wireless network (100) meets the load threshold.

At step 605, the electronic device (300) performs no action when the load of the RACH impacted cell (400) in the wireless network (100) not meets the load threshold (e.g. when the traffic load is low)

At step 605, the electronic device (300) performs no action when the load of the RACH impacted cell (400) in the wireless network (100) not meets the load threshold (e.g. when the traffic load is low)

At step 606, the electronic device (300) determines whether the RACH counter meets a RACH counter degradation threshold when the load of the RACH impacted cell (400) in the wireless network (100) meets the load threshold (e.g. when the traffic load is High or moderate)

At step 607, the electronic device (300) determines whether neighbour check is required or not when the RACH counter meets the RACH counter degradation threshold.

At step 608, the electronic device (300) detects whether a Root Sequence Index (RSI) collision between the RACH impacted cell (40) and the neighbour cell.

At step 609, the electronic device (300) changes to the RSI of the at least one neighbour cell or blacklist the at least one neighbour cell having a long distance neighbour relationship when the RSI collision is detected.

At step 610, the electronic device (300) deletes the at least one neighbour cell having a far distance upcoming neighbour relation upto two tier when the RSI collision is not detected.

At step 611, the electronic device (300) blacklists a long distance neighbour relation when the RSI collision is not detected.

At step 612, the electronic device (300) determines whether the RACH counter for large and small size messages meets a large and small size message RACH counter threshold when the RACH counter does not meet the RACH counter degradation threshold.

At step 613, the electronic device (300) generates the mitigation plan when the RACH counter for large and small size messages meets the large and small size message RACH counter threshold, wherein the mitigation plan comprises checking UpLink (UL) Interference KPI, wherein checking the UL interference KPI comprises at least one of optimizing UL parameter, feature implementation, initial access parameter change, analyze spectrum to check external devices and checking Received Total Wideband Power (RTWP), wherein the optimizing UL parameter including reduction of power in UL such UL power control parameter and Physical Random Access Channel Power ramping.

At step 614, the electronic device (300) generates the mitigation plan when the RACH counter for large and small size messages meets the large and small size message RACH counter threshold, wherein the mitigation plan comprises analyzing a DownLink (DL) Interference Log file, wherein analyzing the DL interference log file comprise at least one of PCI collision and confusion, physical optimization, RSI collision and parameter optimization. A drive test log is used by tool or other log file analysis tool to analyze Signal Interference Noise Ratio (SINR) value for each step and based on that DL interference is calculated and provide action like Physical optimization of E/M tilt and azimuth and RSI collision or parameter change.

At step 615, the electronic device (300) generates the mitigation plan when the RACH counter for large and small size messages meets the large and small size message RACH counter threshold, wherein the mitigation plan comprises checking an overshooting KPI, wherein checking the overshooting KPI comprises at least one of identifying overshooting impacted cell and down-tilt impacted cell to reduce coverage, parameter optimization for E-tilt and power reduction and load balancing high number of Radio Resource Control (RRC) connected user. Further timing advance KPI can be obtained from the OSS to identify overshooting impacted cell and accordingly E tile, M tilt, height reduction and power reduction can be performed.

At step 616, the electronic device (300) generates the mitigation plan when the mitigation plans in step 613, step 614 and step 615 are failed, wherein the mitigation plan comprises checking robustness of a Physical Downlink Control Channel (PDCCH) and Physical Downlink Shared Channel (PDSCH), wherein checking robustness of the PDCCH and PDSCH comprises at least one of increasing the no of PDCCH resources and maximizing number of coding rate.

At step 617, the electronic device (300) determines whether the RACH counter of the at least one RACH impacted cell (400) is only for the large size message when the RACH counter for large and small size messages not meets the large and small size message RACH counter threshold.

At step 618, the electronic device (300) determines the mitigation plan when the RACH counter of the RACH impacted cell (400) is only for the large size message, wherein the mitigation plan comprises checking poor coverage issues which further comprises increasing Electrical/Mechanical (E/M) Tilt, Maximum Power (P max), increasing impacted cell power parameter to enhance coverage. The coverage can be improved when the E/M tilt is adjusted from the OSS, and the power can be adjusted through OSS to enhance the coverage of the cell.

At step 619, the electronic device (300) determines the mitigation plan when the RACH counter of the RACH impacted cell (400) is only for the large size message, wherein the mitigation plan comprises comparing a distance between a user equipment and a nearest cell. The mitigation plan further comprises determining, by the electronic device, whether the distance between the user equipment and the nearest cell meets a distance threshold and performs E/M tilt or power reduction of the RACH impacted cell (400) changes directly on OSS.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Accordingly, the embodiments herein disclose the electronic device for determining the RACH impacted cell in the wireless network. The processor is further configured to detect a cell of the plurality of cells as RACH impacted cell when the RACH counter of the cell meet the RACH attempt threshold and detect a cell of the plurality of cells as non-impacted cell when the RACH counter of the cell does not meet the RACH attempt threshold. The RACH impacted cell controller is further configured to generate the mitigation plan for optimizing the RACH impacted cell. The invention have a list of advantages including solving RACH failures rapidly with the help of automation, increases productivity, increases quality in identifying the RACH impacted cell. The invention have further advantages including identifying the root cause of the RACH impacted cells and providing mitigation solution for the identified RACH impacted cells in accordance with the identified root cause.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. An electronic device for determining a Random-Access Channel (RACH) impacted cell in a wireless network, wherein the electronic device comprises
a memory; and
a processor; configured to:
receive a RACH key performance indicator (KPI) of each cell of a plurality of cells for a predefined time period;
for each cell of the plurality of cells, determine a RACH counter indicating a number of RACH attempts made for the predefined time period based on the RACH KPI;
for each cell of the plurality of cells, determine whether the number of RACH attempts determined for the predefined time period meets a RACH counter threshold;
perform one of:
detect at least one cell of the plurality of cells as a RACH impacted cell when the number of RACH attempts of the at least one cell meets the RACH counter threshold, and
detect at least one cell of the plurality of cells as a non-impacted cell when the number of RACH attempts of the at least one cell does not meet the RACH counter threshold; and
generate a RACH cell report comprising information about the at least one RACH impacted cell and the at least one non-impacted cell,
wherein the processor is further configured to:
determine whether a load of the at least one RACH impacted cell in the wireless network meets a load threshold; and
determine at least one mitigation plan for the at least one RACH impacted cell to optimize a performance of the wireless network based on the RACH counter of the at least one RACH impacted cell in response to determining that the load of the at least one RACH impacted cell meets the load threshold; and
optimize the performance of the wireless network by applying the mitigation plan on the at least one RACH impacted cell in the wireless network, wherein the processor is further configured to, in determining the at least one mitigation plan for the at least one RACH impacted cell:
  determine whether the RACH counter of the at least one RACH impacted cell is only for a large-size message or for both a large-size message and a small-size message;
  perform one of:
    generate the mitigation plan when the RACH counter of the at least one RACH impacted cell is for both the large and small messages, wherein the mitigation plan comprises at least one of checking UpLink (UL) Interference KPI, analyzing a DownLink (DL) Interference Log file, checking an overshooting KPI, and checking robustness of a Physical Downlink Control Channel (PDCCH) and Physical Downlink Shared Channel (PDSCH), and
    generate the mitigation plan when the RACH counter of the at least one RACH impacted cell is only for the large size message, wherein the mitigation plan comprises checking a poor coverage issue and comparing a distance between a user equipment and a nearest cell.

2. The electronic device as claimed in claim 1, wherein the processor is further configured to, in determining the at least one mitigation plan for the at least one RACH impacted cell:
  determine at least one neighbour cell of the at least one RACH impacted cell based on the RACH counter;
  detect whether a Root Sequence Index (RSI) collision between the at least one RACH impacted cell and the at least one neighbour cell;
  perform one of:
    generate the mitigation plan when the RSI collision is detected, wherein the mitigation plan comprises changes to the RSI of the at least one neighbour cell or blacklist the at least one neighbour cell having a long distance neighbour relationship;
    generate the mitigation plan when the RSI collision is not detected, wherein the mitigation plan comprises deleting the at least one neighbour cell having a far distance upcoming neighbour relation up to two tier or blacklisting a long distance neighbour relation.

3. A method for determining a Random-Access Channel (RACH) impacted cell in a wireless network, wherein the method comprises
  receiving, by an electronic device, a RACH key performance indicator (KPI) of each cell of a plurality of cells for a predefined time period;
  for each cell of the plurality of cells-, determining by the electronic device, a RACH counter indicating a number of RACH attempts made for the predefined time period based on the RACH KPI;
  for each cell of the plurality of cells, determining by the electronic device, whether the number of RACH attempts determined for the predefined time period meets a RACH counter threshold;
  performing, by the electronic device, one of:
    detecting at least one cell of the plurality of cells as RACH impacted cell when the number of RACH attempts of the at least one cell meets the RACH counter threshold, and
    detecting at least one cell of the plurality of cells as a non-impacted cell when the number of RACH attempts of the at least one cell does not meet the RACH counter threshold;
  generating, by the electronic device, a RACH cell report comprising information about the at least one RACH impacted cell and the at least one non-impacted cell, wherein the method further comprises:
    determining, by the electronic device, whether a load of the at least one RACH impacted cell in the wireless network meets a load threshold;
    determining, by the electronic device, at least one mitigation plan for the at least one RACH impacted cell to optimize a performance of the wireless network based on the RACH counter of the at least one RACH impacted cell in response to determining that the load of the at least one RACH impacted cell meets the load threshold; and
    optimizing, by the electronic device, the performance of the wireless network by applying the mitigation plan on the at least one RACH impacted cell in the wireless network, wherein determining, by the electronic device, the at least one mitigation plan for the at least one RACH impacted cell comprises:
      determining, by the electronic device, whether the RACH counter of the at least one RACH impacted cell is only for a large size message or for both a large size message and a small size message; and
      performing, by the electronic device, one of:
        generating, by the electronic device, the mitigation plan when the RACH counter of the at least one RACH impacted cell is for both the large and small messages, wherein the mitigation plan comprises at least one of checking UpLink (UL) Interference KPI, analyzing a DownLink (DL) Interference Log file, checking an overshooting KPI, and checking robustness of a Physical Downlink Control Channel (PDCCH) and Physical Downlink Shared Channel (PDSCH), and
        generating, by the electronic device, the mitigation plan when the RACH counter of the at least one RACH impacted cell is only for the large size message, wherein the mitigation plan comprises checking a poor coverage issues and comparing a distance between a user equipment and a nearest cell.

4. The method as claimed in claim 3, wherein determining, by the electronic device, the at least one mitigation plan for the at least one RACH impacted cell comprises:
  determining, by the electronic device, at least one neighbour cell of the at least one RACH impacted cell based on the RACH counter;
  detecting, by the electronic device, whether a Root Sequence Index (RSI) collision between the at least one RACH impacted cell and the at least one neighbour cell; and
  performing, by the electronic device, one of:
    generating the mitigation plan when the RSI collision is detected, wherein the mitigation plan comprises changes to the RSI of the at least one neighbour cell or blacklist the at least one neighbour cell having a long-distance neighbour relationship;
    generating the mitigation plan when the RSI collision is not detected, wherein the mitigation plan comprises delete the at least one neighbour cell having a far distance upcoming neighbour relation up-to two tier or blacklist a long distance neighbour relation.

5. The method as claimed in claim 3, wherein the method further comprises:
  receiving, by the RACH impacted cell, the mitigation plan from the electronic device; and optimizing, by the RACH impacted cell, the performance of the RACH impacted cell by applying the received mitigation plan.

6. The method as claimed in 5, wherein applying the mitigation plan at the RACH impacted cell comprises at least one of:

changing the RSI of the at least one neighbour cell, deleting the at least one neighbour cell having a far distance upcoming neighbour relation up to two tier, blacklisting a long distance neighbour relation, checking UpLink (UL) Interference KPI, analyzing a DownLink (DL) Interference Log file, checking an overshooting KPI, checking robustness of a Physical Downlink Control Channel (PDCCH) and Physical Downlink Shared Channel (PDSCH), checking a poor coverage issue and comparing a distance between a user equipment and a nearest cell.

\* \* \* \* \*